Oct. 23, 1923.
J. R. CARMAN
NAILLESS HORSESHOE
Filed April 18, 1922
1,471,827
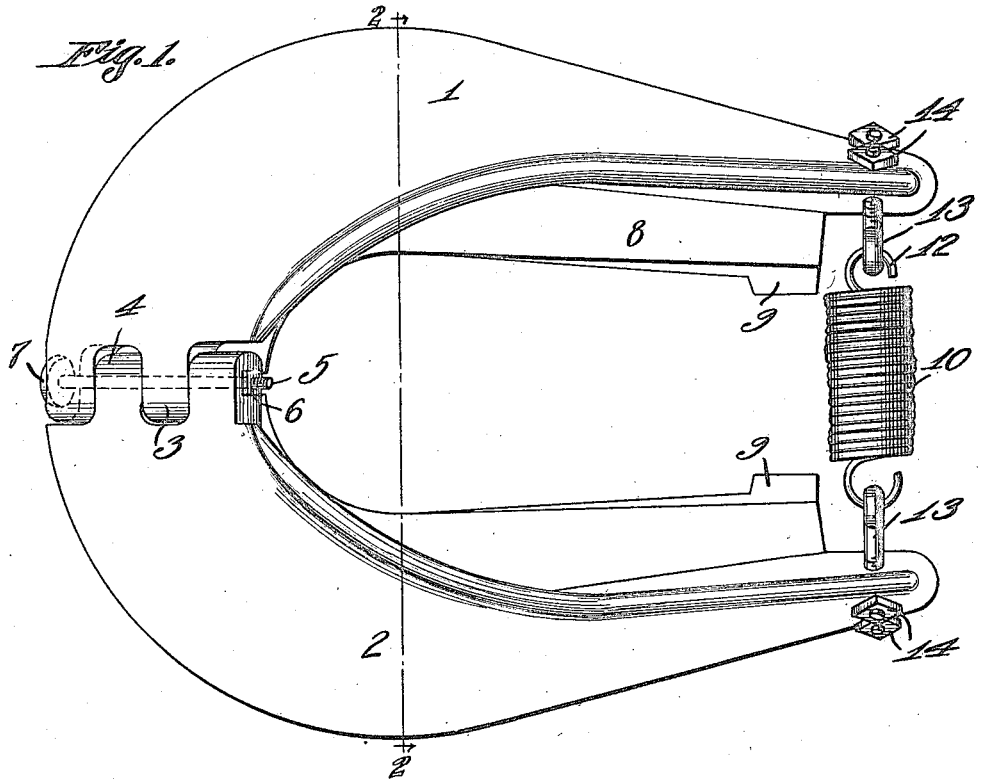
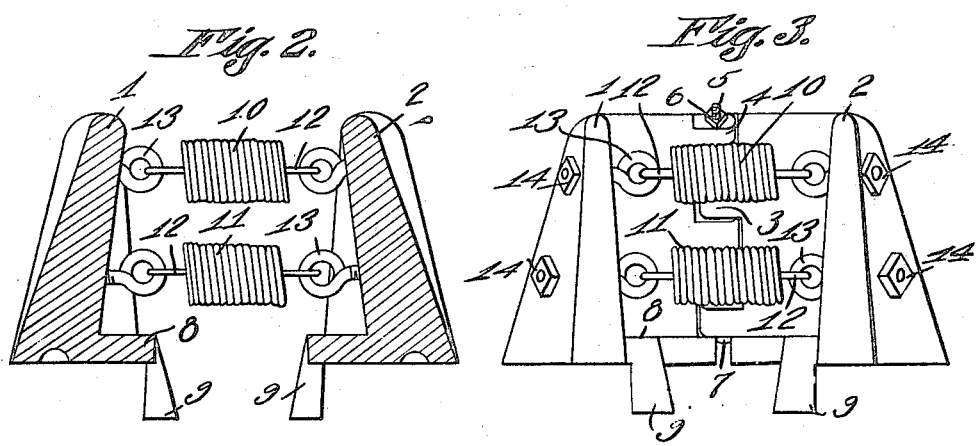
J. R. Carman, Inventor
By (signature), Attorney Patented Oct. 23, 1923.

1,471,827

UNITED STATES PATENT OFFICE.

JAMES R. CARMAN, OF BEAVER DAM, KENTUCKY.

NAILLESS HORSESHOE.

Application filed April 18, 1922. Serial No. 554,597.

*To all whom it may concern:*

Be it known that I, JAMES R. CARMAN, a citizen of the United States, residing at Beaver Dam, in the county of Ohio and State of Kentucky, have invented a new and useful Nailless Horseshoe, of which the following is a specification.

This invention relates to nailless horseshoes.

The object of the invention is to provide a shoe of this character constructed to accurately fit over the hoof and yieldably but reliably be secured in operative position without danger of hurting the horse's foot and yet be securely held against accidental disengagement.

With the foregoing and other objects in view which will appear as the description proceeds, the invention resides in the combination and arrangement of parts and in the details of construction hereinafter described, it being understood that changes in the precise embodiment of the invention herein disclosed may be made within the scope of what is claimed without departing from the spirit of the invention.

In the accompanying drawings:—

Figure 1 represents a plan view of a horseshoe constructed in accordance with this invention, Fig. 2 is a transverse section taken on the line 2—2 of Fig. 1, and Fig. 3 is a rear elevation thereof.

In the embodiment illustrated, the horseshoe constituting this invention is composed of two similar sections 1 and 2 provided at their meeting front ends with hinge knuckles 3 and 4 through which extends a pintle in the form of a bolt having a screw nut 6 on its inner end and having its head 7 countersunk in the lower faces of the adjacent ends of the sections so that there will be no danger of the head being sheared off.

The sections 1 and 2 are shaped when assembled to conform to the hoof on which the shoe is to be used, each of which is provided at its lower edge with an inturned flange 8 preferably provided at their rear ends with calks 9, although these may be omitted if found desirable.

The rear ends of sections 1 and 2 are yieldably connected by a pair of coiled heavy wire springs 10 and 11, the ends of each of which are extended longitudinally and bent to form eyes 12 with which are engaged eye bolts 13 removably engaged with the ends of the sections and held assembled by securing nuts 14.

From the above description it will be obvious that when the sections 1 and 2 are fitted around the hoof of the horse and the coiled springs 10 and 11 secured to connect the rear ends of said sections, the shoe will be securely held on the hoof and yet will be sufficiently yieldable to prevent undue compression such as might be uncomfortable to the horse.

I claim:—

A horseshoe of the class described formed of two sections shaped to fit a horse's hoof when assembled, said sections being hingedly connected at their front ends, a pair of coiled springs connecting the rear ends of said sections and each having its outer coils extended longitudinally and bent to form attaching eyes, and eye-bolts engaged with the eyes of said springs and extended through the ends of said sections.

In testimony that I claim the foregoing as my own, I have hereto affixed my signature in the presence of two witnesses.

JAMES R. CARMAN.

Witnesses:
W. F. CARTER,
R. E. ESTES.